(12) United States Patent
Ogino

(10) Patent No.: US 6,433,946 B2
(45) Date of Patent: Aug. 13, 2002

(54) INFORMATION SIGNAL OUTPUT CONTROL METHOD, INFORMATION SIGNAL DUPLICATION PREVENTION METHOD, INFORMATION SIGNAL DUPLICATION PREVENTION DEVICE, AND INFORMATION SIGNAL RECORDING MEDIUM

(75) Inventor: Akira Ogino, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/821,350

(22) Filed: Mar. 29, 2001

Related U.S. Application Data

(62) Division of application No. 09/007,186, filed on Jan. 15, 1998.

(30) Foreign Application Priority Data

Jan. 23, 1997 (JP) .............................. 9-010212

(51) Int. Cl.⁷ .............................. G11B 15/04; G11B 5/86
(52) U.S. Cl. .......................... 360/60; 360/15; 380/203; 386/94
(58) Field of Search ....................... 360/15, 60; 386/84, 386/94; 380/203, 201

(56) References Cited

U.S. PATENT DOCUMENTS

| | | | | |
|---|---|---|---|---|
| 5,459,583 A | * | 10/1995 | Nakata | 386/84 |
| 6,101,051 A | | 8/2000 | Sugita et al. | 360/2 |
| 6,112,008 A | * | 8/2000 | Sugita et al. | 386/94 |

* cited by examiner

*Primary Examiner*—Regina N. Holder
(74) *Attorney, Agent, or Firm*—Jay H. Maioli

(57) ABSTRACT

If only any one of a pair of an SS anti-duplication control signal S5 and copy guard signal S6 generated correlatively each other added on the video signal played back from the disk is detected, or if the specific anti-duplication control signal is not detected, the video signal recorded in the disk is judged to be an illegally duplicated video signal, and the output control signal generation section controls the output control section so as not to output the playback video signal S4.

8 Claims, 12 Drawing Sheets

ANTI-DUPLICATION CONTROL SIGNAL
SPECTRUM BEFORE SPECTRAL SPREAD

ANTI-DUPLICATION CONTROL SIGNAL
SPECTRUM AFTER SPECTRAL SPREAD

SPECTRUM OF INFORMATION SIGNAL ON WHICH SS
ANTI-DUPLICATION CONTROL SIGNAL IS SUPERIMPOSED

SIGNAL SPECTRUM AFTER SPECTRAL INVERSION
SPREAD IN RECORDING DEVICE SIDE

FIG. 7

| COPY GUARD SIGNAL S6 | SS ANTI-DUPLICATION CONTROL SIGNAL S5 | OUTPUT | DUPLICATION |
|---|---|---|---|
| YES | YES | YES | NO |
| YES | NO | NO | NO |
| NO | YES | NO | NO |
| NO | NO | YES | YES |

F I G. 10

| COPY GUARD SIGNAL S13 | SS ANTI-DUPLICATION CONTROL SIGNAL S14 | OUTPUT | DUPLICATION |
|---|---|---|---|
| YES | YES | YES | NO |
| YES | NO | YES | NO |
| NO | YES | NO | NO |
| NO | NO | YES | YES |

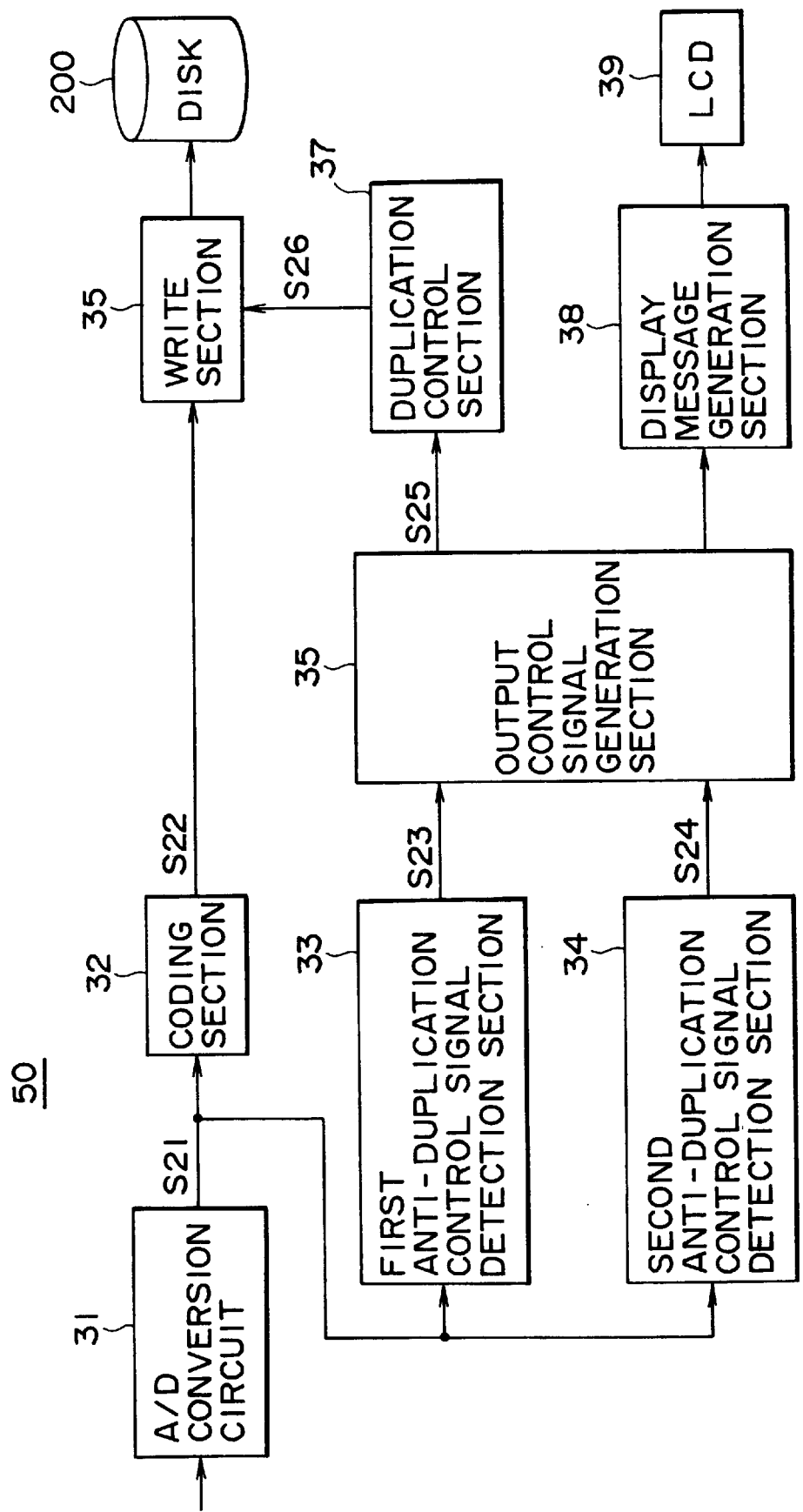

INFORMATION SIGNAL OUTPUT CONTROL METHOD, INFORMATION SIGNAL DUPLICATION PREVENTION METHOD, INFORMATION SIGNAL DUPLICATION PREVENTION DEVICE, AND INFORMATION SIGNAL RECORDING MEDIUM

Which is a Division under 37 CFR 1.53(b) of application Ser. No. 09/007,186 filed Jan. 15, 1998.

BACKGROUND OF THE INVENTION

1. Field of the Invention

This invention relates to a method, device, and recording medium for output control and duplication prevention control using, for example, an anti-duplication control signal recorded in a recording medium together with an information signal.

2. Description of Related Art

VTR (Video Tape recording devices) has been popularized in daily life, and many kinds of software which can be played back on a VTR are supplied abundantly. Digital VTR or DVD (Digital Video Disks) playback devices have been available commercially now, and provide images and sound of exceptionally high quality.

On the other hand, there is, however, a problem in that software applications of this great abundance can be copied without restriction, and several methods have already been proposed to inhibit duplication.

For example, though the method is a method which inhibits duplication of an analog video signal not directly, one method to prevent copying uses a difference in the AGC (Automatic Gain Control) system, or in the APC (Automatic Phase Control) system, for example, between the VTR recording device and a monitor receiver for displaying the image.

For example, the method which utilizes the difference in AGC system, in which a VTR performs AGC using a pseudo sync signal inserted in the video signal and a monitor receiver employs a different AGC system not using the pseudo sync signal, is an example of the former, in detail, when an analog video signal is recorded in an original recording medium, a very high level pseudo sync signal is previously inserted as a sync signal for AGC, and the very high level pseudo sync signal is inserted in the video signal to be supplied from a playback VTR to a recording VTR as a sync signal for AGC.

Alternately, the method which utilizes the difference of APC characteristics between a VTR and receiver as in the case that APC in a VTR can follows the color burst signal in a video signal with a short time constant but APC in a receiver follows with a relatively long time constant is an example of the latter, in detail, the phase of the color burst signal of a video signal is previously inverted partially when the analog video signal is recorded in an original recording medium, and the color burst signal having partially inverted phase is outputted as a video signal to be supplied from a playback VTR to a recording VTR.

As the result, the monitor receiver which receives the analog video signal from the playback VTR plays back the image correctly without being affected by the pseudo sync signal in AGC or without desired affection of the partial phase inversion of the color burst signal used for APC.

On the other hand, in a VTR, which is supplied with the analog video signal from the playback VTR into which pseudo sync signals have been inserted or which has been subjected to color burst signal phase inversion control as described herein above, for receiving such analog video signal and for recording the analog video signal in a recording medium, proper gain control or phase control based on the input signal cannot be performed, and so the video signal is not correctly recorded. Even if this signal is played back, therefore, normal picture and sound cannot be obtained.

As described herein above, in the case that involves an analog video signal, the prevention is not a method for directly inhibiting duplication but is a method for viewing an abnormally played back picture which can not viewed normally. Such prevention method is a passive duplication prevention control.

On the other hand, in the case that a digitized information, for example, video signal is involved, an anti-duplication signal or an anti-duplication control signal comprising, for example, a duplication ranking control code, is added as digital data to the video signal and recorded on the recording medium, so as to prevent or control duplication of the image.

FIG. 1 is a basic structural diagram of a duplication apparatus for duplicating digitized information, a digital information played back by the digital playback device 110 is sent to a digital recording device 120 through a digital transmission line 101, and the digital recording device 101 duplicates the digital information if duplication is permitted and does not duplicate the digital information if duplication is not permitted.

An anti-duplication control information in the form of additional information is recorded in a recording medium 111 placed on the digital playback device 110 in addition to a digital main information. The anti-duplication control information indicates control content such as duplication inhibition, duplication permission, or generation restriction. The digital playback section 113 reads out the information from the recording medium 111, acquires the anti-duplication control information together with the digital main information, and sends them to the digital recording medium 120 through the digital transmission line 101.

An anti-duplication control signal detection section 122 of the digital recording device 120 detects the anti-duplication control signal out of the information received from the digital transmission line 101, and judges the control content. The judgement result is sent to a digital recording section 121.

If the judgement result of the anti-duplication control signal from the anti-duplication control signal detection section 122 indicates permission of recording of the digital information inputted through the digital transmission line 101, then the digital recording section 121 converts the input digital signal to a digital information suitable for recording, and writes it in the recording medium 123, that is, recording is performed. On the other hand, if the judgement result of the anti-duplication control signal from the anti-duplication control signal detection section 122 indicates duplication inhibition, then the digital recording section 121 does not perform recording processing of the input digital information.

Further, if the judgement result of the anti-duplication control signal from the anti-duplication control signal detection section 122 indicates permission of recording of only the first generation, then the digital recording section 121 converts the input digital signal to a digital information suitable for recording, and writes it in the recording medium 123, that is, recording is performed, and additionally, converts the anti-duplication control signal in the form of additional information to a signal for indicating duplication inhibition (duplication inhibition of next generation), and records it in the recording medium 123. Therefore, the video signal can not be duplicated further using the recording medium 123 in which the duplicated information is recorded.

As described herein above, in the case of digital connection that the main information signal and anti-duplication control signal added as an additional information are supplied to a recording device in the form of digital signal, because the anti-duplication control signal is contained in the digital data to be transmitted, duplication prevention control such as duplication inhibition is performed consistently in a recording device using the anti-duplication control signal.

In the case of a duplication prevention control method in which the above-mentioned difference in AGC system or the difference in APC characteristics between a VTR and monitor receiver is used, a pseudo sync signal is inserted in the video signal recorded in a recording medium or the phase of color burst signal is inverted partially. In other word, this method involves processing as described herein above on the sync signal portion, hence a video signal which provides a normal image can undesirably duplicated after the sync signal is changed. The duplicated video signal can be duplicated repeatedly.

In the case of a duplication prevention control method utilizing the difference in AGC system or the difference in APC characteristics between a VTR and monitor receiver, a video signal is undesirably recorded normally depending on the AGC system or APC characteristics of the recording device side, a video signal can be duplicated even without changing sync signal portion. As described herein above, it can happen that even such passive duplication prevention does not work.

In the case of a device which involves the digitized video signal described herein above using FIG. 1, if the position where an anti-duplication control signal is recorded is recognized, then it is possible to duplicate the video signal by changing the portion where the anti-duplication control signal is recorded or by removing the anti-duplication control signal.

In the case that the digital playback device in FIG. 1 is, for example, a digital VTR, in order to monitor the played back video signal and audio signal, only. both the video signal, that is the main information signal, and audio signal are converted to an analog signal through a D/A conversion circuit 113 and guided to an analog output terminal 114 connected usually to a monitor receiver.

As described herein above, though the playback device is a device for playing back digital signals, the anti-duplication control signal is not contained in the analog signal guided to the analog output terminal 114. Therefore, in the case of analog connection that an analog device such as analog VTR is connected to the analog output terminal 114, duplication of the information signal is undesirably possible.

As described herein above, on the video signal from which an anti-duplication signal added originally on the video signal is removed and which duplicated thereafter in a recording medium, there is no anti-duplication control signal. It is not required to remove an anti-duplication control signal for duplication, hence, the video signal which is duplicated illegally can be played back or duplicated without restriction. In this case, illegal duplication can be operated more easily.

Further, in the case that a recording medium in which an illegally duplicated video signal is recorded is used, the image is played back normally, therefore, a user can not recognize whether the video signal recorded in the recording medium is a video signal recorded illegally or not illegally. Hence, if the video signal recorded in the recording medium is a video signal duplicated illegally, users do not complain to a supplier who duplicated and supplied the video signal illegally about the video signal unless the quality of the played back image is very poor, as the result, illegally duplicated video signals become abundant.

In view of the above-mentioned problem, it is the object of the present invention to provide a method, device, and recording medium for preventing illegal duplication of information signals such as video signals and preventing use of video signals duplicated illegally in order to eliminate the above-mentioned problem.

SUMMARY OF THE INVENTION

To solve the above-mentioned problem, the information signal output control method in accordance with the present invention involves a method in which a plurality of anti-duplication control signals of different types generated correlatively each other added on the information signal is detected, and the output control of the information signal is performed dependently on detection condition of the plurality of anti-duplication control signals of different types.

In the information signal output control method in accordance with the present invention, a notice information is outputted if a specific anti-duplication control signal out of the plurality of anti-duplication control signals of different types generated correlatively each other added on the information signal is missed and playback output of the information signal is not outputted.

In the information signal output control method in accordance with the present invention, one of the plurality of anti-duplication control signals of different types generated correlatively each other is a spectrally spread anti-duplication control signal added on the information signal.

The information signal duplication prevention method in accordance with the present invention involves a method in which when an information signal is duplicated, the information signal on which the plurality of anti-duplication control signals of different types generated correlatively each other is added is duplicated.

In the information signal duplication prevention method in accordance with the present invention. one of the plurality of anti-duplication control signals of different types generated correlatively each other is a spectrally spread anti-duplication control signal superimposed on the information signal.

In the information signal duplication prevention method in accordance with the present invention, in the case that the plurality of anti-duplication control signals of different types added on the information signal is detected and at least any one of the plurality of anti-duplication control signals of different types added on the information signal is missed, a notice information is outputted.

According to the information signal output control method in accordance with the present invention, the output control of an information signal is performed dependently on detection condition of a plurality of anti-duplication control signals generated correlatively each other added on the information signal.

For example, if all the plurality of anti-duplication control signals added on the video signal is detected or all the anti-duplication control signals are not detected, the information signal is judged to be a legally duplicated information signal and the video signal is outputted.

On the other hand, if, for example, the anti-duplication control signal which should be added without exception out of a plurality of anti-duplication control signals which should be added on the information signals is not detected, the information signal is judged to be an information signal from which the above-mentioned anti-duplication control signal is removed probably for the purpose of illegal duplication, and the information signal is controlled so as not to be outputted.

Hence, the illegally duplicated information signal is not used. Users will complain against the supplier who has supplied the illegally duplicated information signal that the information signals can not be used, the complain lets the supplier recognize that the information signal can not be illegally duplicated, and thus illegal duplication of the information signal is prevented.

According to the information signal output control method in accordance with the present invention, if, for example, the specific anti-duplication control signal which should be added without exception out of a plurality of anti-duplication control signals which should be added on the information signal is missed, the information signal is not outputted, and a notice message for indicating that this information signal is an illegally duplicated information signal is outputted instead.

Hence, the user can recognize clearly that the information signal to be outputted if it is normal is not outputted not due to failure of the device for outputting the information signal, but due to illegal duplication.

According to the information signal output control method in accordance with the present invention, one of a plurality of anti-duplication control signals of different types added on the information signal is an anti-duplication control signal spectrally spread and added on the information signal.

Because the spectrally spread anti-duplication control signal is added on the information signal as a wide-band low-level spectral spread signal, it is difficult to remove it intentionally. Therefore, the spectrally spread anti-duplication control signal remains consistently on the information signal, the spectrally spread anti-duplication control signal exists, hence, if other anti-duplication control signals which should be contained in the sync signal are not detected due to changing of sync signal, then the information signal is judged clearly to be an illegally duplicated information signal.

According to the information signal duplication prevention method in accordance with the present invention, in the case that duplication of the information signal is performed, a plurality of anti-duplication control signals of different types having the correlative relation that as long as the one anti-duplication control signal exists then the other anti-duplication control signal also exists without exception is added on the information signal and the information signal is duplicated.

By adding a plurality of anti-duplication control signals of different types with correlative generation on the information signal and by recording the information signal in a recording medium, if at least one of the plurality of anti-duplication control signals added on the information signal is missed, the information signal is judged easily to be an illegally duplicated information signal.

According to the information signal duplication prevention method in accordance with the present invention, one of the plurality of anti-duplication control signals of different types to be added on the information signal to be recorded is spectrally spread and then added on the information signal.

As described herein above, it is difficult to remove an anti-duplication control signal intentionally because the spectrally spread anti-duplication control signal is added on the information signal as a wide-band low-level spectral spread signal. Hence, if an illegally duplicated information signal contains the one spectrally spread anti-duplication control signal and the other anti-duplication control signal is not detected, this information signal is judged clearly to be an illegally duplicated information signal.

According to the information signal duplication prevention method in accordance with the present invention, if at least any one of the plurality of anti-duplication control signals of different types which should be added normally on the information signal is missed, a notice information is outputted.

Thereby, a user can recognize that the information signal which wanted to be duplicated is an illegally duplicated information signal.

BRIEF DESCRIPTION OF THE DRAWINGS

FIG. 7 is a diagram for describing output control of the video signal in the video signal output device shown in FIG. 2.

FIG. 10 is a diagram for describing output control of the video signal recorded by the video signal recording playback system shown in FIG. 9.

FIG. 11 is a block diagram for illustrating one embodiment of the video signal recording device used as the information signal duplication prevention device in accordance with the present invention.

DETAILED DESCRIPTION OF THE PREFERRED EMBODIMENTS

One embodiment of an information signal output control method, information signal duplication control method, information signal duplication prevention device, and information signal recording medium in accordance with the present invention will be described in detail with reference to the drawings.

The Video signal output device and video signal recording device described hereinafter comprises an information signal output device and information signal reception device provided as the information signal duplication prevention device in accordance with the present invention, and will be described as devices which are applied to a DVD (digital video disk) recording/playback device (referred to as DVD device hereinafter) for the purpose of description. Description of audio signal system will be omitted for simplification of the description.

First Embodiment

Figure 1:
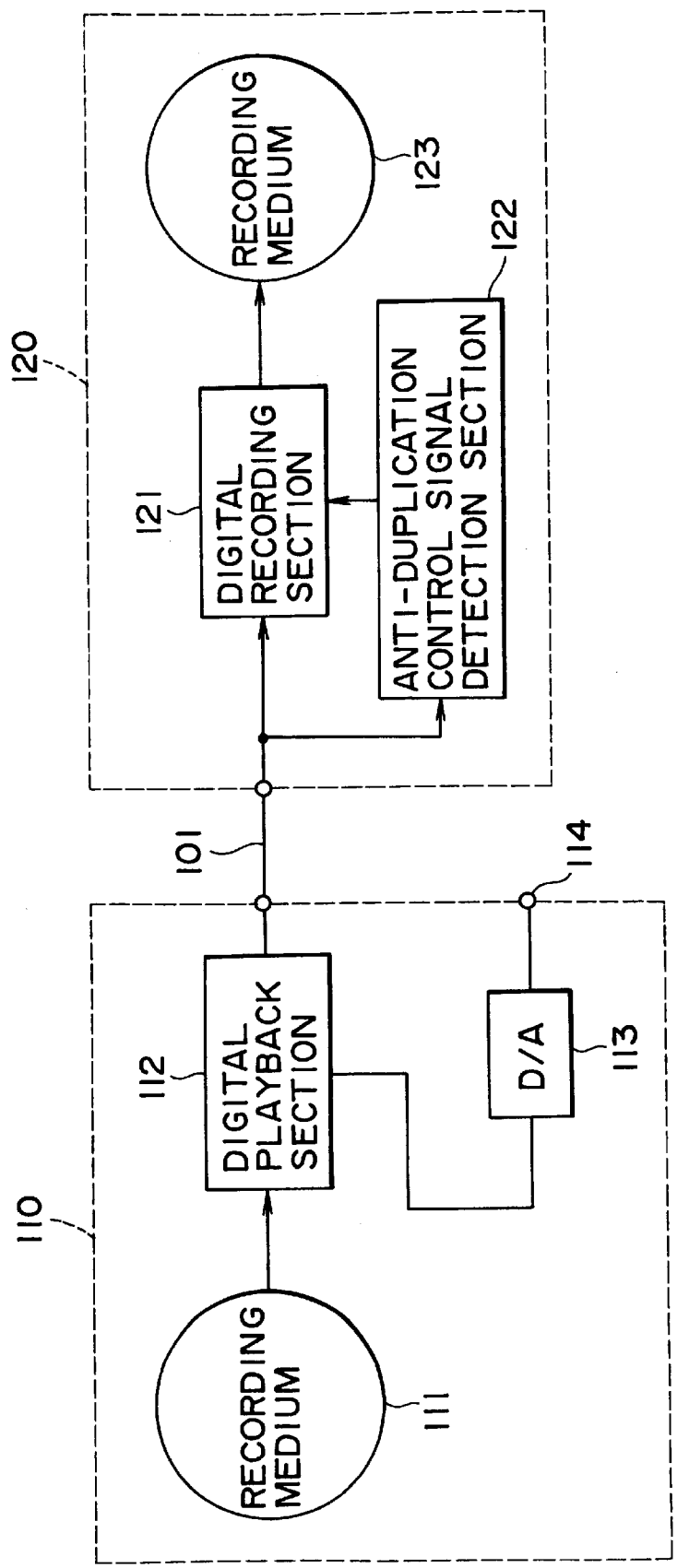
FIG. 1 is a block diagram for illustrating the conventional structure of a duplication prevention control system.
Figure 2:
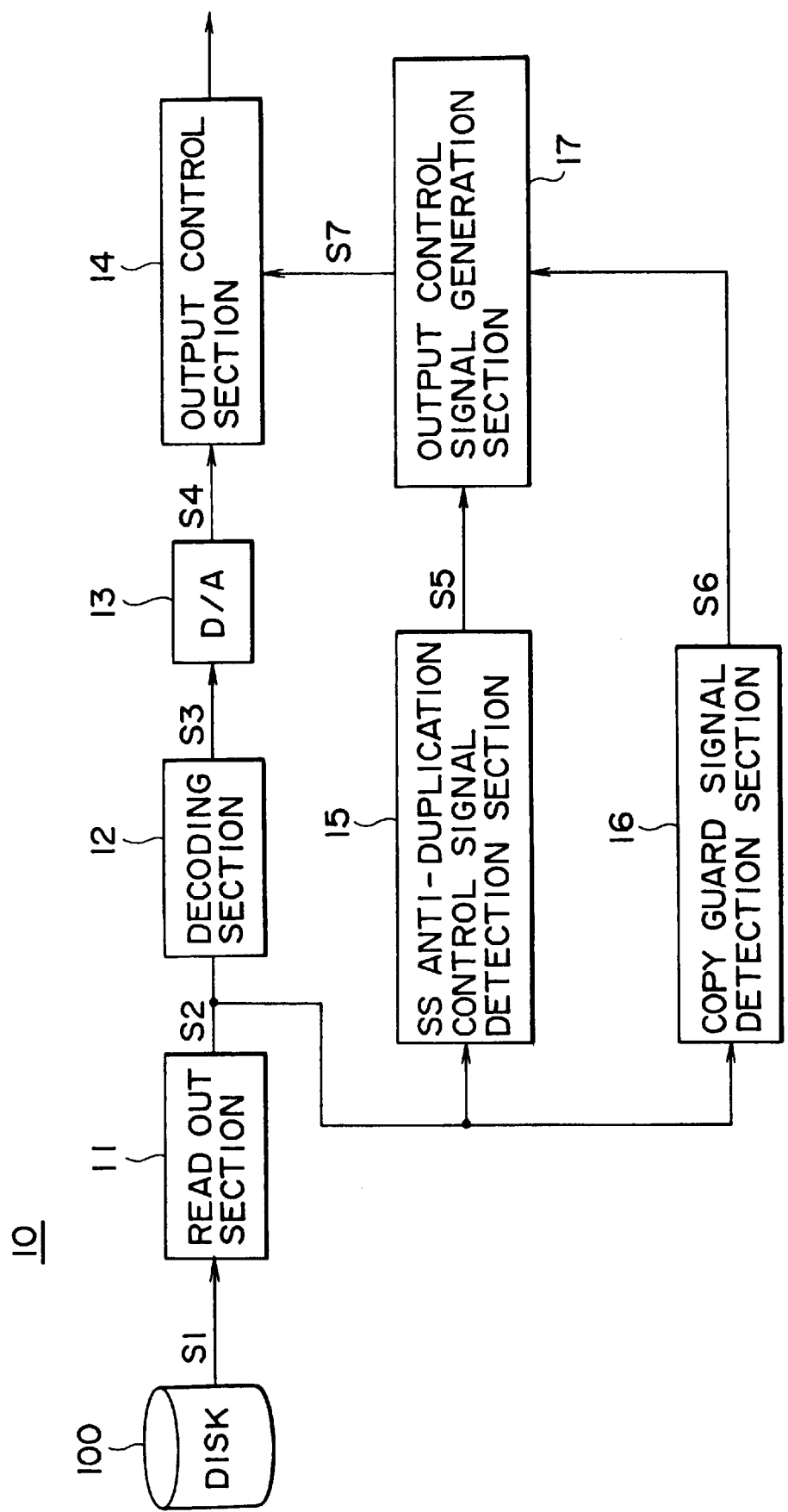
FIG. 2 is a block diagram for illustrating one embodiment of a video signal output device used as the information signal duplication prevention device in accordance with the present invention.

FIG. 2 is a block diagram for illustrating a video signal output device (referred to simply as output device hereinafter) of the first embodiment. In other words, the output device 10 is corresponding to a playback system of a DVD device in the first embodiment.

As shown in FIG. 2, the output device 10 of this embodiment is provided with a read out section 11, decoding section 12, D/A conversion circuit 13, output control section 14, SS (SS stands for spectral spread hereinafter) anti-duplication control signal detection section 15, copy guard signal detection section 16, and output control signal generation section 17.

In FIG. 2, digitized video signals and audio signals and two types of anti-duplication control signals of SS anti-duplication control signal S5 and copy guard signal S6 generated correlated together as the additional information are recorded in a disk 100, and in this example, the disk 100 is a DVD.

In the first embodiment, both the SS anti-duplication control signal S5 and copy guard signal S6 are signals for indicating generation restriction such as duplication permission of the first generation, or duplication inhibition or permission of the video signal, and composed of one bit or several bit. In a normally made disk, always a video signal on which an SS anti-duplication control signal S5 and copy guard signal S6 are both added is recorded.

The output device 10 of the first embodiment is a device which performs output control of the video signal dependently on detection condition of the two types of anti-duplication control signal as described herein and hereinafter.

The video signal recorded in the disk 100 used in the output device 10 of the first embodiment, and two types of anti-duplication control signal of the SS anti-duplication control signal S5 and copy guard signal S6 added on the video signal are described using FIGS. 2 to 5.

Figure 3:
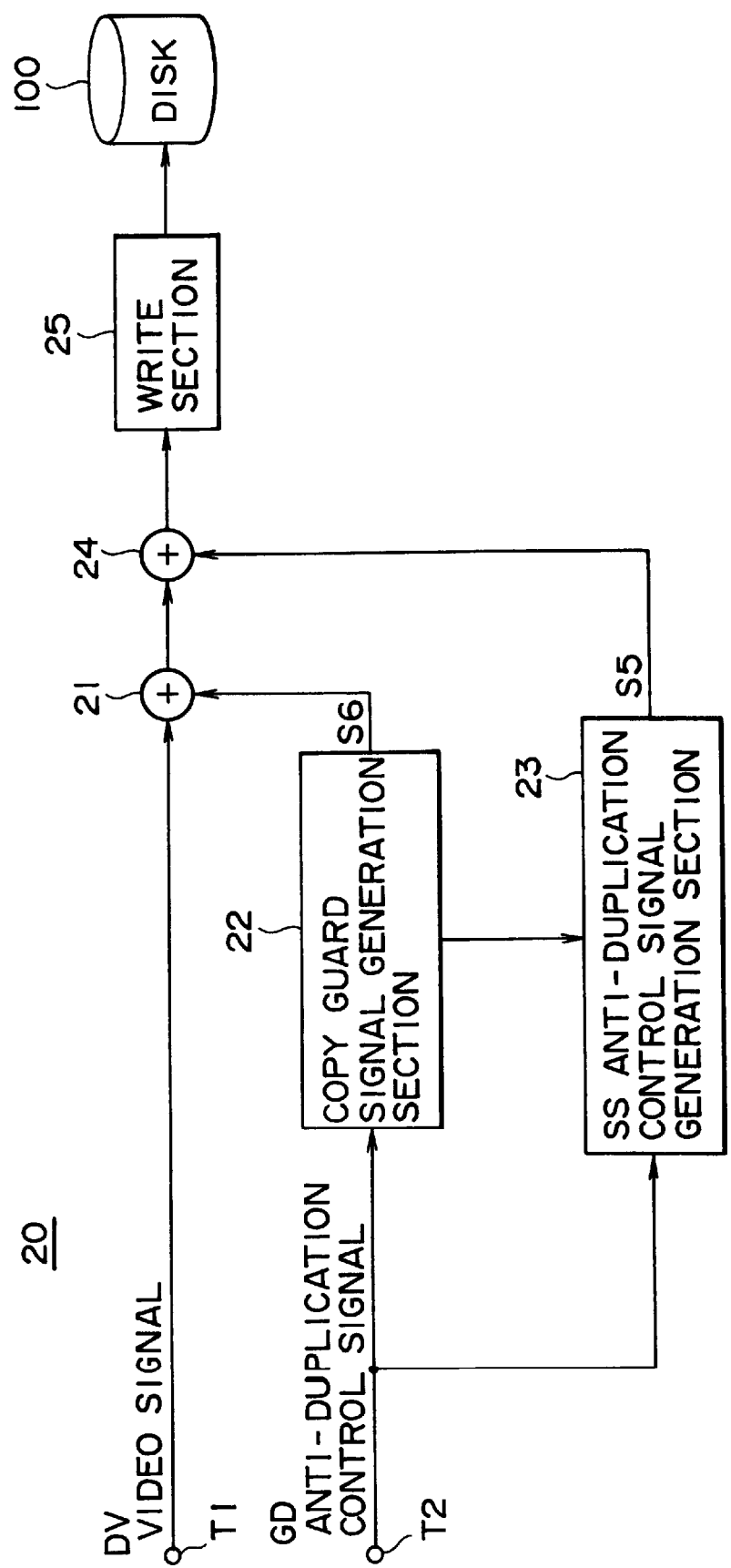
FIG. 3 is a block diagram for illustrating a recording device for recording a video signal on which two types of anti-duplication control signals generated correlatively each other.

FIG. 3 is a diagram for illustrating a video signal recording device 20 (referred to simply as recording device hereinafter) for adding the SS anti-duplication control signal and copy guard signal on the video signal DV and recording the video signal DV on which the SS anti-duplication control signal S5 and copy guard signal S6 are added in the disk 100. In this first embodiment, the recording device 20 is a device for forming a disk in which the video signal DV is duplicated legally.

As shown in FIG. 3, the recording device 20 is provided with an input terminal T1 for video signals, input terminal T2 for anti-duplication control signals GD, addition circuits 21 and 24, copy guard signal generation section 22, SS anti-duplication control signal generation section 23, and write section 25.

In this first embodiment, the anti-duplication control signal DG is inputted through the input terminal T2 in the form of 1 bit signal for, for example, inhibiting duplication of the video signal, and supplied to the copy guard signal generation section 22 and SS anti-duplication control signal generation section 23.

The copy guard signal generation section 22 generates a copy guard signal S6 based on the anti-duplication control signal GD. The SS anti-duplication control signal generation section 23 generates SS anti-duplication control signals S5 by spectrally spreading anti-duplication control signals GD correspondingly to the indication from copy guard signal generation section 22.

In the first embodiment, the copy guard signal S6 is an anti-duplication control signal so-called CGMS. FIG. 3 is a diagram for describing a copy guard signal S6. In FIG. 3, 1H indicates 1 horizontal interval. In the first embodiment, a copy guard signal S6 is superimposed, for example, on the 20-th horizontal interval of the vertical retrace line erasing period of the video signal.

In this case, 20 bits of additional information is superimposed on the 20-th horizontal interval of the vertical retrace line erasing period, and 1 bit to several bits out of the 20 bit additional information is used as a copy guard signal S6. In the FIG. 3, out of signals which are superimposed on the 20-th horizontal interval, the signal REF is a reference signal for indicating that the signal superimposed on this horizontal interval is a copy guard signal.

In the first embodiment, the copy guard signal S6 generated in the copy guard signal generation section 22 is supplied to the addition circuit 21, and added on the 20-th horizontal interval of each vertical retrace line erasing period of the video signal DV as shown in FIG. 3.

A PN (Pseudorandom Noise) series code (referred to as PN code hereinafter) is used as a spread code for the SS anti-duplication control signal S5, and a narrow-band high-level anti-duplication control signal GD is spectrally spread, then, superimposed on the video signal DV in the same time and the same frequency as a wide-band low-level signal.

Figure 4:
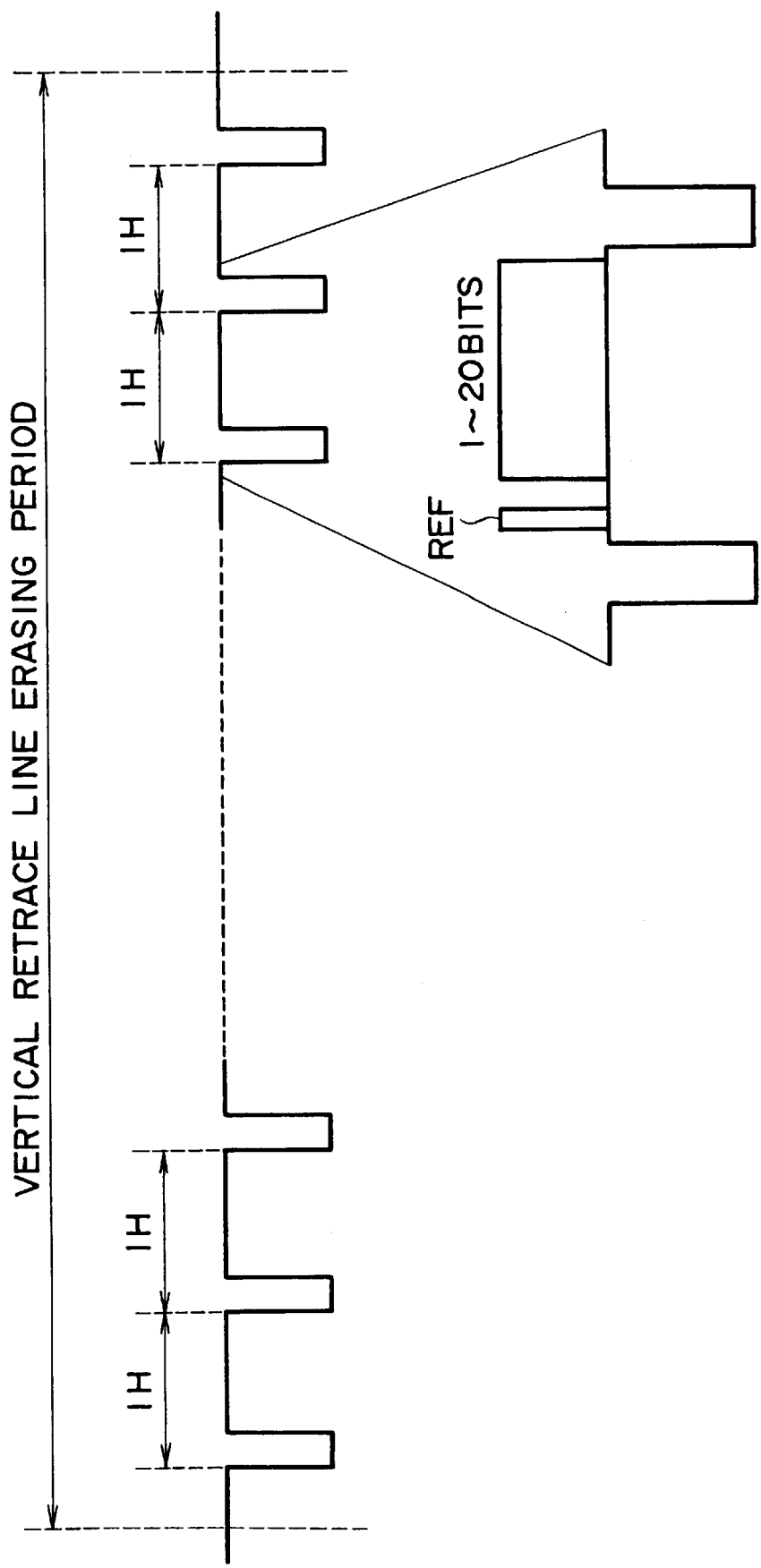
FIG. 4 is a diagram for describing one example of the anti-duplication control signal.
Figure 5A:
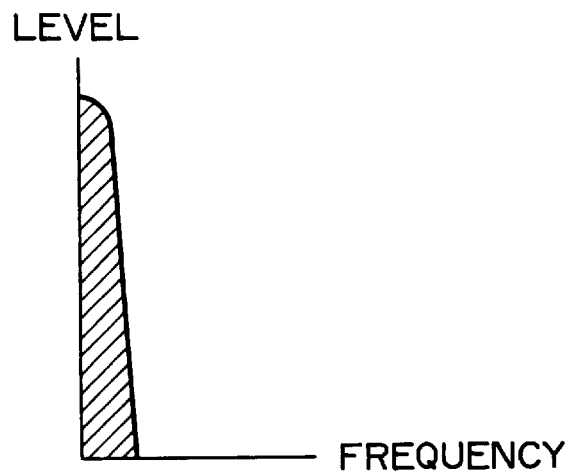
FIG. 5 is a set of graphs for describing the relation between the SS anti-duplication control signal and information signal in the form of spectrum.
Figure 5B:
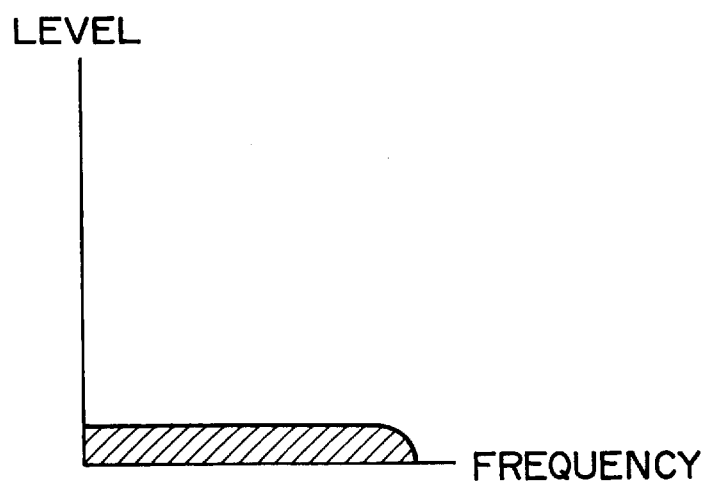
Figure 5C:
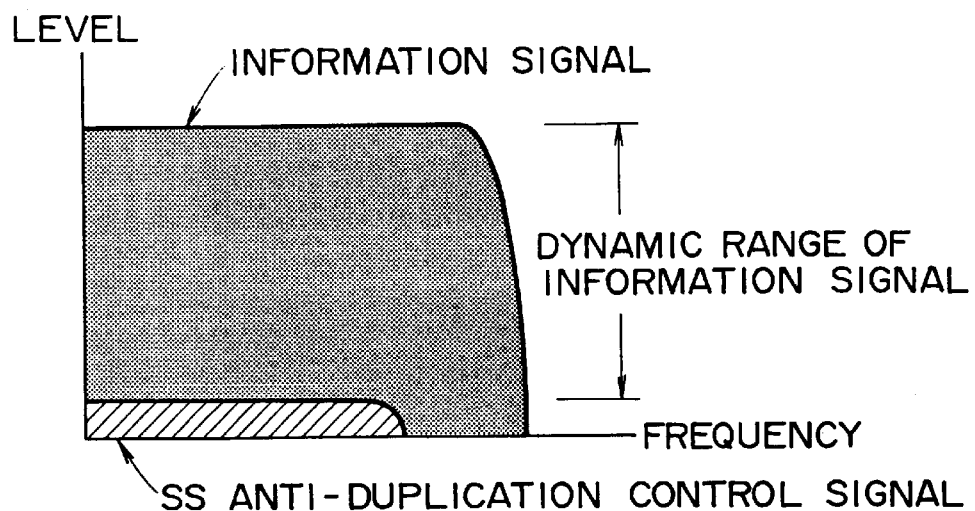
Figure 5D:
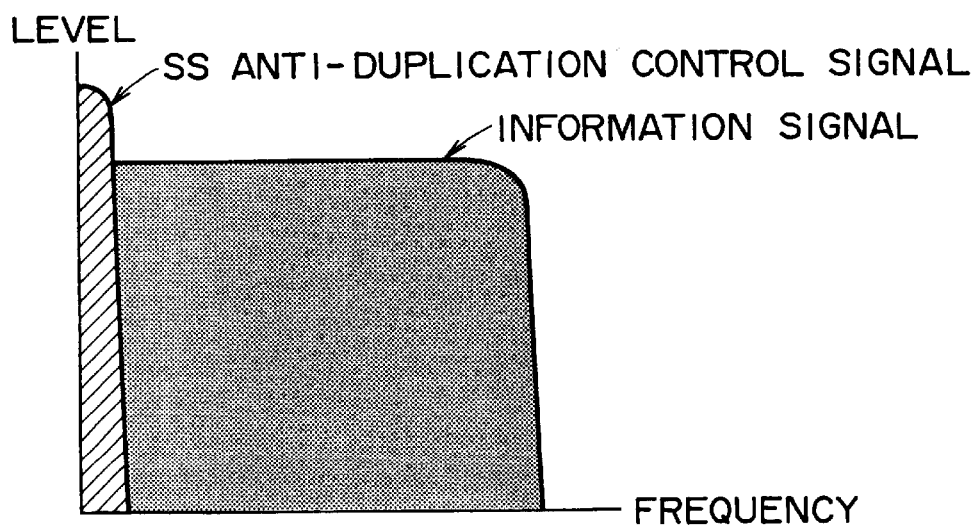

FIG. 4 is a set of graphs for describing the relation between the anti-duplication control signal and the main information signal, namely the video signal in this example. An anti-duplication control signal contains a small quantity of information and a signal of low bit rate, and a narrow-band signal. An anti-duplication control signal is changed to a wide-band signal as shown in FIG. 4(b) by being subjected to spectral spread. When, the level of a spectrally spread signal becomes low in inverse proportion to the enlargement ratio of the band.

This spectrally spread signal, namely the SS anti-duplication control signal S5, is superimposed on the information signal. When, an SS anti-duplication control signal S5 is superimposed on the video signal with a lower level than the dynamic range of the video signal which is involved as an information signal as shown in FIG. 4(c).

On the other hand, as described hereinafter, when inversion spectral spread is performed in order to detect the SS anti-duplication control signal S5, the spectrally spread signal is restored again as a narrow-band signal. By giving a sufficient band spread ratio, power of the anti-duplication control signal after inversion spread exceeds that of the information signal and such sufficient spread ratio enables the anti-duplication control signal to be detected.

In this case, the SS anti-duplication control signal S5 superimposed on the video signal is superimposed on the video signal in the same time and the same frequency, therefore, it is impossible to remove or change the anti-duplication control signal by using frequency filter or simple replacement of the information.

As described herein above, the SS anti-duplication control signal S5 superimposed on the video signal will not be removed and is supplied consistently together with the video signal.

The SS anti-duplication control signal S5 generated in the SS anti-duplication control signal generation section 23 is supplied to the addition circuit 24, and superimposed on the video signal VD on which the copy guard signal S6 is added.

The video signal VD on which the SS anti-duplication control signal S5 and copy guard signal S6 are added is supplied to the write section 25, and recorded in the disk 100. In the first embodiment, the write section 25 performs also A/D conversion and coding processing of the video signal to generate the video signal to be recorded in the disk 100.

Figure 6:
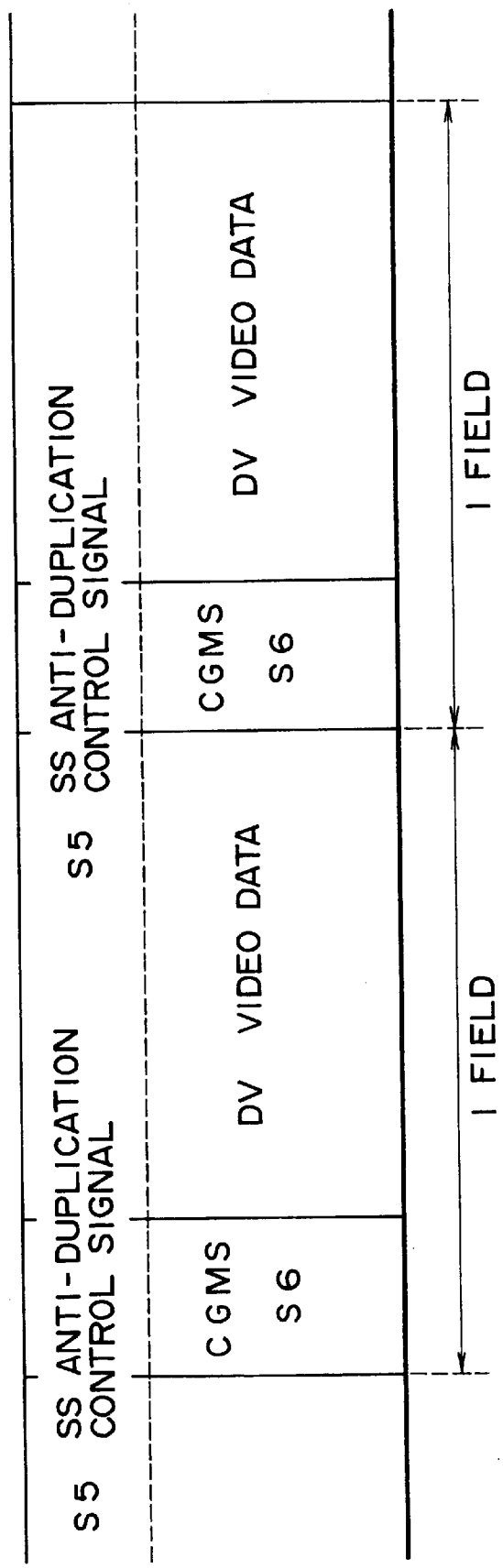
FIG. 6 is a diagram for describing the video signal used as the information signal used in the video signal output device shown in FIG. 2.

As described herein above, the recording device 20 of the first embodiment generates always also the SS anti-duplication control signal S5 when the copy guard signal S6 is generated. Further as shown in FIG. 6, the video signal VD on which the copy guard signal S6 and SS anti-duplication control signal S5 generated correlatively each other are superimposed is recorded in the disk 100.

Next, the structure and operation of the output device 10 which plays back the disk 100, in which the video signal having the SS anti-duplication control signal 55 and copy guard signal S6 added thereon is recorded, and outputs the video signal recorded in the disk 100 as described herein above is described.

The read out section 11 of the output device 10 extracts the playback video signal component S2 from the signal S1 obtained by playing back the disk 100, and supplies it to the decoding section 12, SS anti-duplication control signal detection section 15, and copy guard signal detection section 16. This playback video signal component S2 contains also the SS anti-duplication control signal S5 and copy guard signal S6 as described herein above.

The decoding section 12 performs decoding processing on the playback video signal component S2 to generate a digital video signal 53, and supplies it to the D/A conversion circuit 13. The D/A conversion circuit 13 performs D/A conversion on the digital video signal 53 to generate an analog video signal S4 having the sync signal, and supplies it to the output control section 14.

On the other hand, the SS anti-duplication control signal detection section 15 is provided with a PN code generator and multiplication circuit, performs inversion spectral spread to extract the SS anti-duplication control signal S5 spectrally spread and superimposed on the video signal, and supplies it to the output control signal generation section 17 as the original anti-duplication control signal S5 before spectral spread.

In detail, when the SS anti-duplication control signal S5 is generated by performing spectral spread, the SS anti-duplication control signal detection section 15 generates a PN code string having the same pattern at the same timing as the video signal component S2, and extracts the original anti-duplication control signal S5 before spectral spread from the video signal component S2 by performing inversion spectral spread using this PN code string, and outputs it.

The copy guard signal detection section 16 extracts the copy guard signal S6 which is superimposed on the 20-th horizontal interval of the vertical retrace line erasing period of the video signal component S2, and supplies it to the output control signal generation section 17.

The output control signal generation section 17 generates the output control signal S7 for controlling the output control section 14 dependently on existence of the copy guard signal S6.

FIG. 7 is a diagram for describing operation of the output control signal generation section 17 for generating an output control signal S7 dependently on existence of the copy guard signal S6.

In the first embodiment, if both the SS anti-duplication control signal S5 and copy guard signal S6 are detected as shown in FIG. 7, or if both the SS anti-duplication control signal S5 and copy guard signal S6 are not detected, the output control signal generation section 17 generates a control signal S7 which functions to output the playback video signal S4, and supplies it to the output control section 14.

If only any one of the anti-duplication control signal S5 and copy guard signal S6 is detected, the output control signal generation section 17 generates a control signal S7 for inhibiting output of the playback video signal S4, and supplies it to the output control section 14.

Because of the reason described herein under, output of the playback video signal S4 can be controlled dependently on existence of the anti-duplication control signal S5 and copy guard signal S6 as described herein above.

In detail, in the first embodiment, a pair of two anti-duplication control signals of the SS anti-duplication control signal S5 and copy guard signal S6 is added on the video signal recorded in the disk 100. Therefore, both the SS anti-duplication control signal S5 and copy guard signal S6 are added on the video signal as long as the video signal is a video signal duplicated legally.

However, as described herein above, in the case of the anti-duplication control signal added in the vertical retrace line erasing period like the copy guard signal S6 in the first embodiment, the anti-duplication control signal is easily removed because the addition position where the copy guard signal S6 is added in the video signal is apparent. Moreover, even if all the signals in the vertical retrace line erasing period are replaced entirely, the video signal in the effective picture interval for forming a picture is affected not severely.

Hence, in the case that a recording device which performs duplication prevention control dependently on the copy guard signal S6 and can not perform duplication prevention control dependently on the SS anti-duplication control signal S5 is used, the video signal can be undesirably duplicated once at least the copy guard signal S6 is removed.

Focusing on this point, when the output device 10 of the first embodiment does not detect at least any one of a pair of SS anti-duplication control signal S5 and copy guard signal S6 added on the video signal, the output device 10 judges that the video signal, which is to be played back and outputted, is a video signal which was duplicated illegally, and controls the video signal so as not to be outputted as described herein above.

In the first embodiment, if both the anti-duplication control signal S5 and copy guard signal S6 are not detected, the output control signal generation section 17 generates a control signal S7 which functions to output the playback video signal S4 and supplies it to the output control section 14. Such control is performed because in some cases the SS anti-duplication control signal S5 and copy guard signal S6 are not added originally on the video signal, for example, in the case of a picture taken by a user itself using a video camera or a picture for free duplication.

If both the anti-duplication control signal S5 and copy guard signal S6 are not detected as described herein above, it is considered that an anti-duplication control signal is not added originally on the video signal recorded in the disk 100. Further it is considered that the SS anti-duplication control signal S5 is not removed for the purpose of illegal duplication because it is difficult to remove illegally the SS anti-duplication control signal S5 as described hereinafter. Therefore in this case, the output device 10 of this embodiment controls so as to output the playback video signal S4.

The output device 14 performs output control of the playback video signal S4 based on the control signal S7 supplied from the output control signal generation section 17. The output control section 14 does not output the playback video signal S4 if the control signal 57 supplied from the output control signal generation section 17 is a signal which indicates inhibition of output of the video signal, and on the other hand, outputs the playback video signal S4 if the control signal S7 supplied from the output control signal generation section 17 is a signal which indicates permission of output of the video signal.

As described herein above, if the video signal recorded in the disk 100 lacks at least any one of anti-duplication control signals added on the video signal out of two types of anti-duplication control signals generated correlatively each other, the output device 10 of the first embodiment judges the video signal recorded in the disk 100 to be a video signal duplicated illegally, and does not output the playback signal S4 played back from the disk 100.

On the other hand, if both two types of anti-duplication control signals S5 and S6 added on the video signal recorded in the disk 100 are detected, the output device 10 judges the video signal to be a video signal duplicated legally, and then outputs the playback video signal S4 played back from the disk 100.

Hence, in the output device 10 of the first embodiment, if the video signal lacks at least any one of the SS anti-duplication control signal S5 and copy guard signal S6, then the playback video signal S4 played back from the disk 100 will not be outputted, it is possible not to use an illegally duplicated video signal. Therefore, illegal duplication of a video signal itself becomes meaningless, and illegal duplication itself of an information signal such as video signal is prevented effectively.

In the first embodiment, one of two types of anti-duplication control signal is an SS anti-duplication control signal S5 generated by spectral spread and is superimposed on the video signal in the same time region and frequency band. Hence, it is possible to remove intentionally the SS anti-duplication control signal S5 from the video signal recorded in the disk 100 as described hereinbefore.

As described herein above, because the SS anti-duplication control signal S5 is difficult to be removed, by generating correlatively each other the SS anti-duplication control signal S5 and another anti-duplication control signal and by adding both on the video signal, output control for playing back and outputting of the video signal are performed adequately dependently on existence of two types of anti-duplication control signals.

For generating the SS anti-duplication control signal S5 to be superimposed on the video signal to be recorded in the disk 100, generation start timing of a PN code string used for spectral spread is set with reference to the video sync signal as the reference signal. Hence, by using the video sync signal as the reference signal also for inversion spectral spread, the PN code string for inversion spread can be generated at the same timing with respect to the video signal on which the SS anti-duplication control signal is superimposed.

Hence, in the SS anti-duplication control signal detection section 15, because it is not necessary to perform phase control, in which the PN code string for spectrally spreading the anti-duplication control signal superimposed on the video signal component S2 is detected using, for example, a sliding correlator, and the PN code string for inversion spread is generated at the same timing, the anti-duplication control signal is extracted rapidly by inversion spectral spread.

As shown in FIG. 7, in the output device 10 of the first embodiment, because the SS anti-duplication control signal S5 and copy guard signal S6 are generated correlatively each other, and both the SS anti-duplication control signal S5 and copy guard signal S6 are always added on the video signal, in the case that only any one of anti-duplication control signals is detected, the video signal is not outputted.

In consideration of duplication, even if both the SS anti-duplication control signal S5 and copy guard signal S6 are detected and then the video signal is outputted, the video signal is prevented from being duplicated by performing duplication prevention control based on the anti-duplication control signal as long as at least any one of two types of anti-duplication control signal added on the video signal is detected.

Hence, only when both the SS anti-duplication control signal S5 and copy guard signal S6 are not detected as shown in FIG. 7, the video signal recorded in the recording medium 100 is allowed to be duplicated.

Further as described hereinafter, when a recording medium, in this embodiment the disk 100 in which the video signal is recorded, is manufactured, in some cases, a recording medium on which a new SS anti-duplication control signal generated correlatively with the copy guard signal such as CGMS, which has been already distributed popularly, is added is distributed later.

In the case that at least the specific anti-duplication control signal which should be added on the video signal, the copy guard signal S6 called CGMS in this first embodiment, is detected, or in the case that both the copy guard signal S6 and SS anti-duplication control signal S5 are not detected, the playback video signal is controlled so as to be outputted.

Second Embodiment

Next, the second embodiment of the video signal output device in accordance with the present invention is described.

In the output device 10 of the first embodiment described herein above, if only any one of the SS anti-duplication control signal S5 and copy guard signal S6 is detected, then the video signal to be outputted is judged to be a video signal which was duplicated illegally, and the playback video signal S4 played back from the disk 100 is not allowed to be outputted. Thereby, for example, it is prevented that the video signal which was duplicated illegally by removing intentionally the copy guard signal S6 is used.

Hence, even if the duplication inhibited video signal is duplicated, the video signal is not used, therefore as the result, illegal duplication of the video signal is prevented.

However, in the case of the output device 10 of the first embodiment, if the video signal recorded in the disk 100 is not outputted because, for example, the copy guard signal S6 added on the video signal is removed intentionally and the video signal is an illegally duplicated video signal, no image is displayed on, for example, a monitor receiver which receives supply of the video signal from the output device 10.

In such case, a user can not identify whether an image is not displayed due to a problem of the disk 100 or an image is not displayed due to a problem of the output device 10 or monitor.

To identify the cause, the output device 20 of the second embodiment judges the played back video signal to be a signal illegally duplicated if, for example, only the SS anti-duplication control signal S5 is detected out of two types of anti-duplication control signal of the SS anti-duplication control signal S5 and copy guard signal S6 added on the video signal like the output device 10 of the first embodiment, and the output device 20 outputs a notice message instead of the video signal.

The user who wants to use the illegally duplicated video signal receives a notice for indicating that the video signal which the user wants to use is an illegally duplicated video signal.

Figure 8:
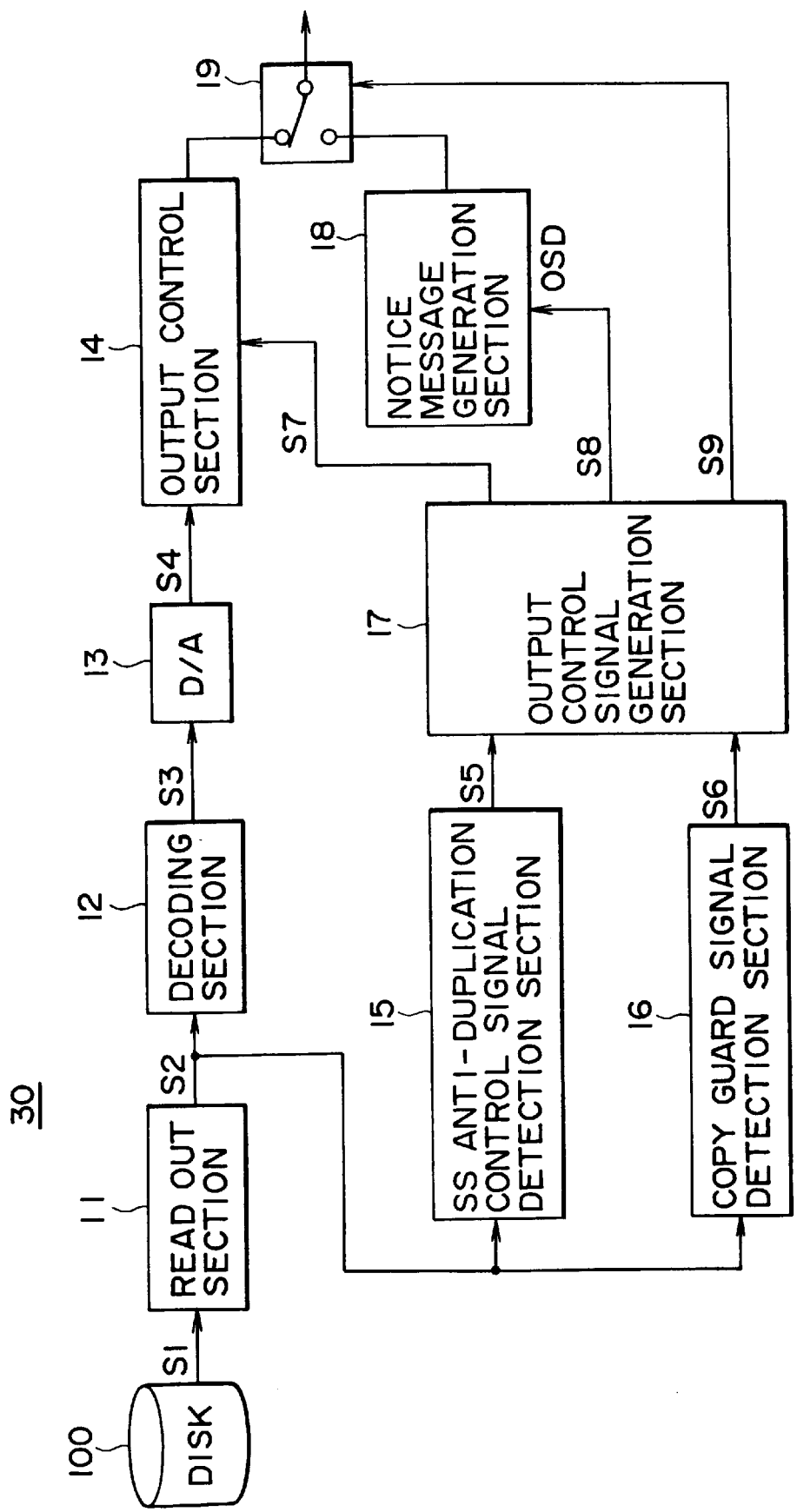
FIG. 8 is a block diagram for illustrating another embodiment of the video signal output device used as the information signal duplication prevention device in accordance with the present invention.

FIG. 8 is a block diagram for illustrating an output device 30 of the second embodiment. As shown in FIG. 8, the output device 30 of the second embodiment is provided with a read out section 11, decoding section 12, D/A conversion circuit 13, output control section 14, SS anti-duplication control signal detection section 15, copy guard signal detection section 16, output control signal generation section 17, notice message generation section 18, and switch circuit 19.

Components other than the notice message generation section 18 and switch circuit 19 is the same components as the components used in the output device 10 of the above-mentioned first embodiment, however, the output control signal generation section 17 is different from the output control signal generation section 17 of the first embodiment in that the output control signal generation section 17 of the second embodiment generates control signals to be supplied also to the notice message generation section 18 and switch circuit 19.

As the first embodiment described herein above, in the disk 100, the video signal on which the SS anti-duplication control signal S5 and copy guard signal S6 generated correlatively each other when the video signal on which no anti-duplication control signal is added is recorded in the disk 100.

The notice message generation section 18 generates and outputs a display message for noticing a user that the video signal recorded in the disk 100 is an illegally duplicated video signal correspondingly to the control signal S8 supplied from the output control signal generation section 17. In the second embodiment, the notice message generation section 18 uses so-called OSD (on screen display), and generates a notice message of 1 screen and outputs it.

The switch circuit 19 switches to output a signal from the output control section 14 or to output a signal from the notice message generation section 18 correspondingly to the control signal S9 supplied from the output control signal generation section 17.

The output control signal generation section 17 of the output device 20 receives supply of an output signal from the SS anti-duplication control signal detection section 15 and copy guard signal detection section 16, and then judges whether the video signal component S2 contains the SS anti-duplication control signal S5 and copy guard signal S6 therein, and correspondingly to the judgement result, generates and outputs control signals S7, S8, and S9 to be supplied to the output control section 14, notice message generation section 18, and switch circuit 19 respectively.

In detail, like the output control signal generation section 17 of the above-mentioned first embodiment, the output control signal generation section 17 of the second embodiment judges the video signal recorded in the disk 100 to be a legally recorded video signal if the output control signal generation section 17 judges the video signal component S2 to be a video signal component which contains both the SS anti-duplication control signal S5 and copy guard signal S6 or judges the video signal component S2 to be a video signal component which does not contain both the SS anti-duplication control signal S5 and copy guard signal S6.

In this case, the output control signal generation section 17 generates a control signal S7 for controlling the output control section 14 to output a playback video signal S4, and generates and outputs a control signal S9 for switching the switch circuit 19 to output the signal supplied from the output control section 14.

The output control signal generation section 17 judges the video signal recorded in the disk 100 to be an illegally duplicated video signal if the SS anti-duplication control signal S5 or copy guard signal S6 is missed. In this case, the output control signal generation section 17 generates a control signal S8 for controlling the notice message generation section 18 to generate and output a notice message, and generates and outputs a control signal S9 for switching the switch circuit 19 to output the signal supplied from the notice message generation section 18.

As described herein above, the output device 20 of the second embodiment outputs the playback video signal S4 if the video signal recorded in the disk 100 contains both the SS anti-duplication control signal S5 and copy guard signal S6 or does not contain both the SS anti-duplication control signal S5 and copy guard signal S6. On the other hand, the output device 20 outputs a notice message instead of the playback video signal S4 if any one of the SS anti-duplication control signal S5 and copy guard signal S6 is missed.

As the notice message, various messages which notice a user that the video signal wanted to be played back is an illegally duplicated video signal, for example, "this video signal is an illegally duplicated video signal, and can not be played back normally" may be used.

Thereby, for example, a video signal which was duplicated illegally by removing the copy guard signal S6 is controlled so as not to be outputted and, in the case that the playback video signal is not outputted, a notice message is displayed so that a user receives a notice which indicates that the video signal recorded in the disk is an illegally duplicated video signal.

In this case, the user can take an action such as complain to the supplier who supplied the illegally duplicated video signal, and thus illegal duplication of the video signal can be prevented effectively from being duplicated.

In the second embodiment, the case that the notice message of 1 screen formed using OSD is displayed is described, however, the present invention is by no means limited to the case.

For example, a notice message may be displayed with the playback video signal using superimposition. In this case, a notice message displayed by way of superimposition may cover the more than half portion of the image played back from the playback video signal S4 in order to prevent the played back image from being used. In this case, a notice message notices a user that the played back video signal is an illegally duplicated video signal, and also the user can recognize that the video signal output device or monitor receiver is not in failure.

Alternatively, a notice for indicating that the video signal wanted to be played back is an illegally duplicated video signal may be outputted by way of voice message instead of a display notice message. In this case, the playback video signal may not be outputted in order to prevent the video signal from being used.

Further alternatively, in the case that the video signal to be outputted is an illegally duplicated video signal, the playback video signal may be subjected to so-called scrambling in order to prevent a normal image from being played back, or scrambling on the playback video signal may be combined with a notice message by way of superimposition. A method in which a notice message by way of superimposition and the image of the playback video signal S4 are outputted and thereafter displaying of the image is discontinued may be used.

Yet alternatively, voice may be mute. In this case, it is possible to notice a user that the video signal wanted to be played back and outputted is an illegally duplicated video signal clearly by combining the mute voice and a notice message display as described herein above.

Also in the output device 30 of the second embodiment, like the output device 10 of the above-mentioned first embodiment, in the case that duplication is considered, as long as at least any one of two anti-duplication control signals added on the video signal is detected, even if both the SS anti-duplication control signal S5 and copy guard signal S6 are detected and the video signal is outputted, the video signal is protected from being duplication by performing duplication prevention control based on the anti-duplication control signal.

Therefore, as shown in FIG. 7, only when both the SS anti-duplication control signal S5 and copy guard signal S6 are not detected, the video signal recorded in the recording medium 100 is outputted and duplicated.

Third Embodiment

In the first and second embodiments described hereinbefore, the video signal on which the SS anti-duplication control signal S5 and copy guard signal S6 generated correlatively each other have been added is recorded originally in the disk 100. Therefore in the case that any one of the SS anti-duplication control signal S5 or the copy guard signal S6 which should be added on the video signal recorded in the disk 100 is missed, the video signal is judged to be a video signal from which the SS anti-duplication control signal S5 or copy guard signal S6 was removed for the purpose of illegal duplication of the video signal.

However, devices and video tapes which output the video signal having, for example, the copy guard signal called as CGMS and micro-vision have been already distributed popularly. In such case that the video signal contains already the copy guard signal, output control and duplication control should be performed based on this copy guard signal.

However, in the case of the above-mentioned first and second output devices 10 and 30, as shown in FIG. 7, if the video signal does not contain any one of the SS anti-duplication control signal S5 and copy guard signal S6, the playback video signal is controlled so as not to be outputted.

In the output device of the third embodiment, if a specific anti-duplication control signal which should be added on the video signal, namely copy guard signal such as CGMS, is detected, then the playback video signal is controlled so as to be outputted.

Further in the case that the video signal on which the copy guard signal is added is transmitted or recorded, for example, the SS anti-duplication control signal is generated based on this copy guard signal, and the SS anti-duplication control signal is added on the video signal, thereby, the video signal transmitted or recorded on a recording medium is prevented from being duplicated illegally.

The case that the SS anti-duplication control signal is added additionally on the video signal based on the copy guard signal added already on the video signal when the video signal is transmitted or duplicated is described herein under.

Figure 9:
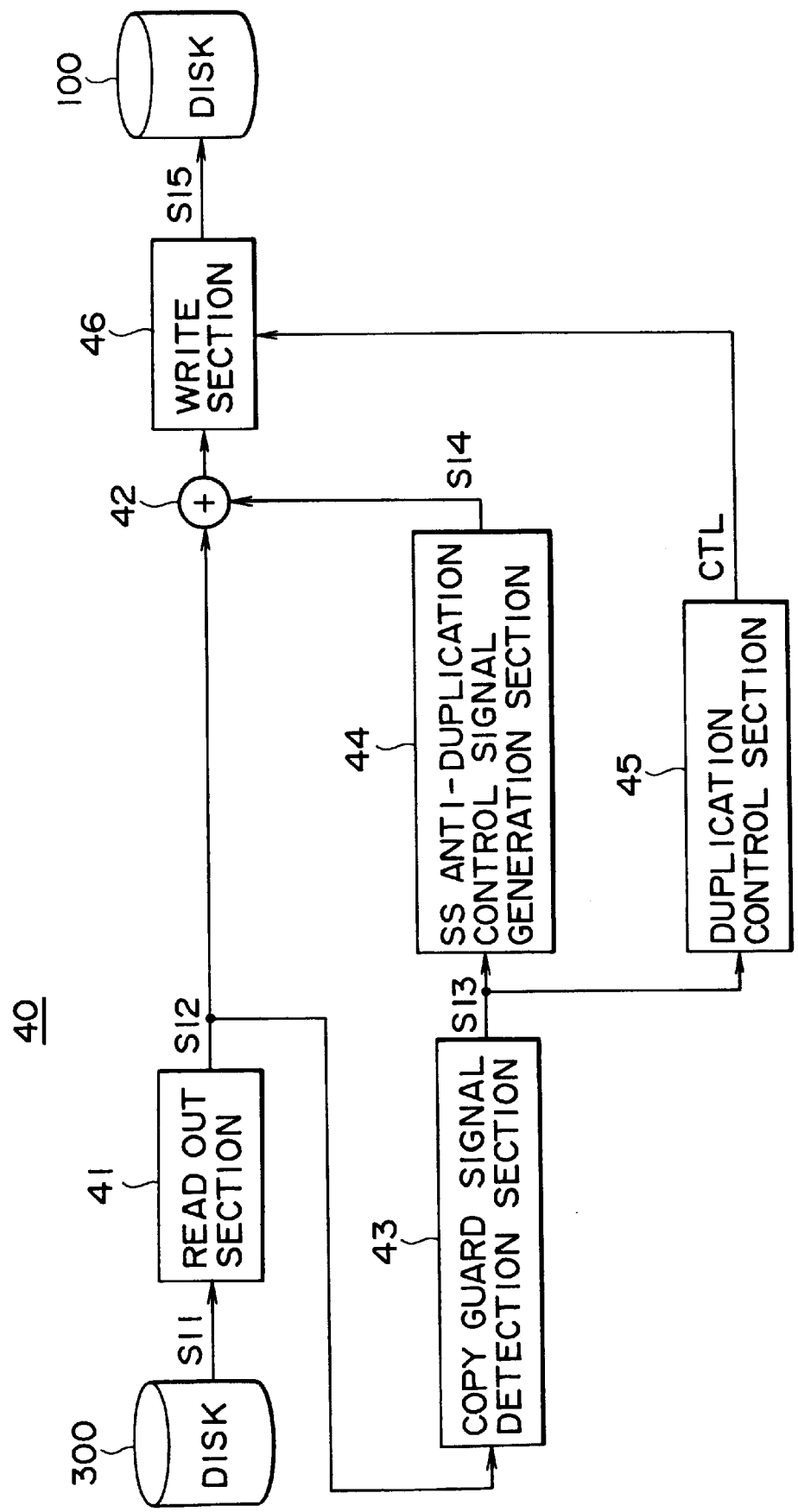
FIG. 9 is a block diagram for illustrating the video signal recording playback system for recording the video signal on Which different types of anti-duplication control signals generated correlatively each other based on the anti-duplication control signal added already on the video signal.

FIG. 9 is a block diagram for illustrating a video signal recording playback system (referred to simply as recording playback system hereinafter) for generating the SS anti-duplication control signal, adding it on the video signal, and recording the added video signal in a recording medium based on the copy guard signal added already on the video signal as described herein above. In this third embodiment, the recording playback system 40 corresponds to, for example, a DVD device.

The recording playback system 40 is provided with a read out section 41, addition circuit 42, copy guard signal detection section 43, SS anti-duplication control signal generation section 44, duplication control section 45, and write section 46 as shown in FIG. 9.

In the third embodiment, the video signal on which only the copy guard signal called as CGMS is added in the disk 300. In the third embodiment, the copy guard signal added on the video signal is an information for indicating generation restriction of duplication, for example, an information for indicating duplication permission of only one generation.

In the third embodiment, the read out section 41 performs decoding processing and D/A conversion processing on the digital video signal component S11 read out from the disk 300, and outputs an analog video signal component S12. The analog video signal component is supplied to the addition circuit 42 and copy guard signal detection section 43.

The copy guard signal detection section 43 detects the copy guard signal S13 added on the 20-th horizontal interval of the vertical retrace line erasing period of the analog video signal component S12, and supplies it to the SS anti-duplication control signal generation section 44 and duplication control section 45.

As described herein above, in the third embodiment, the copy guard signal S13 is a duplication generation restriction information for permitting only the first generation duplication. Hence, the SS anti-duplication control signal generation section 44 generates the SS anti-duplication control signal S14 which indicates duplication inhibition based on the copy guard signal S13, and supplies it to the addition circuit 42.

The addition circuit 42 superimposes the SS anti-duplication control signal S14 on the analog video signal component S12. The analog video signal on which the SS anti-duplication control signal S14 is superimposed is supplied to the write section 46.

In the third embodiment, because the copy guard signal S13 is the information for permitting only the first generation duplication, the duplication control section 45 generates a control signal CTL for permitting duplication, and supplies it to the write section 46. If the copy guard signal S13 is a copy guard signal for indicating duplication inhibition, the duplication control section 45 generates a control signal CTL for inhibiting duplication, and supplies it to the write section 46.

The write section 46 performs A/D conversion processing and coding processing on the analog video signal supplied from the addition circuit 42 to generate a digital video signal component S15 to be written in the disk 100, and writes it in the disk 100.

If the control signal CTL is a signal for inhibiting duplication, the write section 46 does not write the video signal in the disk 100.

Because the copy guard signal S13 is a copy guard signal for permitting only the first generation duplication, therefore in the recording playback system 40 of the third embodiment, the copy guard signal added on the video signal supplied from the addition circuit 42 is changed from the information for permitting the first generation duplication to the information for inhibiting duplication.

As described herein above, in the recording playback system 40 of the third embodiment, the SS anti-duplication control signal S14 is generated based on the copy guard signal S13 added already on the video signal, and the SS anti-duplication control signal is superimposed on the video signal to be recorded in the disk 100. Therefore, the video signal in the disk 100 on which both the copy guard signal and SS anti-duplication control signal generated correlatively each other are added is recorded in the disk 100.

As described herein above, the video signal recorded in the disk 100 together with the copy guard signal and SS anti-duplication control signal generated correlatively with the copy guard signal added on the video signal is played back and outputted using the output device 10 or 30 of the above-mentioned first or second embodiment.

Herein under, the case in which the video signal is played back from the disk 100 in which the video signal is recorded by mans of the recording playback system 40 and is outputted using the output device 10 or 30 shown in FIG. 2 or FIG. 8 is described.

In the case of the third embodiment, the SS anti-duplication control signal S14 is generated later based on the copy guard signal added already on the video signal and superimposed on the video signal. Hence, if the SS anti-duplication control signal S14 is not added on the video signal and as long as the copy guard signal S13 is added on the video signal, this video signal is judged to be a video signal duplicated legally.

In other words, the disk 300 shown in FIG. 9 in which the video signal having the copy guard signal added thereon is recorded is a disk in which the video signal is duplicated legally. Therefore, unlike the above-mentioned first and second embodiments, the video signal recording playback system 40 does not control so that the video signal recorded in the disk 300 is not outputted merely because the SS anti-duplication control signal is not added.

Hence, in the third embodiment, in the case that the disk 100 in which the video signal is recorded or the disk 300 in which the video signal having the copy guard signal S13 added thereon is played back using the recording playback system 40, control in the output control signal generation section 17 of the above-mentioned output device 10 or 30 is different.

FIG. 10 is a diagram for describing control of the output control signal generation section 17 of the output device 10 or 30 in the case that the SS anti-duplication control signal is generated based on the copy guard signal, the SS anti-duplication control signal is additionally added on the video signal, and the video signal is played back and outputted when the copy guard signal is already added on the video signal.

In the third embodiment, the output control signal generation section 17 of the output device 10 or 30 judges the video signal to be a legally duplicated video signal when at least the copy guard signal S13 is detected as shown in FIG. 10, and supplies a control signal S7 for controlling the output control section 14 so as to output the played back video signal.

Further, in the case that both the copy guard signal S13 and SS anti-duplication control signal S14 are not detected, the output control signal generation section 17 judges the video signal to be a video signal having originally no anti-duplication control signal and a video signal of free duplication, and generates a control signal S7 for controlling so that the video signal is outputted and supplies the control signal S7 to the output-control section 14.

Then, if the copy guard signal S13 which should be added on the video signal is not detected and the SS anti-duplication control signal S14 is detected, the output control signal generation section 17 judges the video signal to be a video signal from which the copy guard signal S13 is removed for the purpose of illegal duplication of the video signal, and the video. signal is not outputted.

As described herein above, only for the case that the copy guard signal S13 which should be added on the video signal is not detected and the SS anti-duplication control signal S14 generated based on the copy guard signal S13 is detected, the video signal is not outputted.

By controlling as described herein above, in the case of the disk 300 in which the video signal having only copy guard signal S13 added thereon and also in the case of the disk 100 in which the video signal having the copy guard signal S13 and the SS anti-duplication control signal S14 generated based on the copy guard signal S13 added thereon is recorded, only the video signal duplicated legally is outputted as described herein above.

Further as described herein above, in the case that the copy guard signal added already on the video signal is an information for indicating generation restriction duplication, the SS anti-duplication control signal is generated based on this copy guard signal, it is added on the video signal in addition to the copy guard signal, thereby, illegal duplication after legal duplication can be prevented effectively.

Like the output devices 10 and 30 of the above-mentioned first and second embodiments, in the third embodiment, in the case that duplication is considered, as long as at least any one of two anti-duplication control signals added on the video signal is detected, by performing duplication prevention control based on the anti-duplication control signal, both the SS anti-duplication control signal S5 and copy guard signal S6 are detected, and the video signal is prevented from being duplicated even in the case that the video signal is outputted.

In the third embodiment, the case that the copy guard signal detection section 43 detects the copy guard signal called as CGMS is described, however, the present invention is by no means limited to the case, alternative case, that a plurality of anti-duplication control signals such as CGMS and macro-vision is detected, output control is performed based on the detected anti-duplication control signal, and the SS anti-duplication control signal S14 is generated based on the detected anti-duplication control signal, may be used.

Fourth Embodiment

Next, a recording device 50 which functions as a information signal duplication prevention device in accordance with the present invention is described.

FIG. 11 is a block diagram for illustrating the recording device 50 of the fourth embodiment. In the fourth embodiment, the recording device 50 corresponds to a recording system of a DVD device.

The recording device 50 is provided with an A/D conversion circuit 31, coding section 32, first anti-duplication control signal detection section 33, second anti-duplication control signal detection section 34, write section 35, output control signal generation section 36, duplication control section 37, display message generation section 38, and LCD (liquid crystal display) 39 as shown in FIG. 11. A disk 200 is a DVD in which the video signal is written by the recording device 50.

The recording device 50 receives supply of an analog video signal outputted from the output device 10 or 20 described in the above-mentioned first, second, or third embodiment. The A/D conversion circuit 31 converts the supplied analog video signal to a digital video signal S21, and the digital video signal S21 is supplied to the coding section 32, first anti-duplication control signal detection section 33, and second anti-duplication control signal detection section 34.

Upon receiving supply of the digital video signal S21, the coding section 22 performs coding processing such as removal of the video sync signal and data compression of the digital video signal to generates a digital video signal S22 for recording to be supplied to the disk 200, and supplies it to the write section 35.

The first anti-duplication control signal detection section 33 has the same function as the SS anti-duplication control signal detection section 15 of the above-mentioned output devices 10 and 30. In the fourth embodiment, the first anti-duplication control signal detection section 33 detects the SS anti-duplication control signal S23 that is an anti-duplication control signal spectrally spread and superimposed on the video signal S21, and supplies it to the output control signal generation section 36.

The second anti-duplication control signal detection section 34 has the same function as the copy guard signal detection section 16 of the above-mentioned output devices 10 and 30. In the fourth embodiment, the second anti-duplication control signal detection section 34 detects the copy guard signal S24 that is the anti-duplication control signal superimposed on the 20-th horizontal interval of the vertical retrace line erasing period, and supplies it to the output control signal generation section 36.

If both the SS anti-duplication control signal S23 and copy guard signal S24 are detected, the output control signal generation section 36 supplies the signal having the stricter duplication information for duplication prevention control out of two signals to the duplication control section 37. If the SS anti-duplication control signal S23 and copy guard signal S24 have the same content, any one of signals is supplied to the duplication control section 37.

In the fourth embodiment, if both the SS anti-duplication control signal S23 and copy guard signal S24 are not detected, the output control signal generation section 36 judges the video signal supplied to the recording device 30 to be a video signal of free duplication, and supplies a signal for indicating duplication permission to the duplication control section 37.

If only any one of the SS anti-duplication control signal S23 and copy guard signal S24 is detected, the output control signal generation section 36 supplies the detected SS anti-duplication control signal 23 or copy guard signal S24 to the duplication control section 37.

As described herein above, if only the SS anti-duplication control signal S23 is detected out of two anti-duplication control signals which should be added on the video signal, the supplied video signal is judged to be an illegally duplicated video signal. Then, if only the SS anti-duplication control signal S23 is detected out of two types of anti-duplication control signals as described herein above, the output control signal generation section 36 controls the display message generation section 38 so as to output a notice message.

The display message generation section 38 generates a notice message based on the control signal supplied from the output control signal generation section 36, and supplies it to the LCD 39. As the result, for example, a notice message such as "NO recording", "NO duplication", or "this is a video signal duplicated illegally" is displayed on the LCD 39. Hence, a user can recognize that the video signal wanted to be recorded is an illegally duplicated video signal.

Further in this case, the anti-duplication control signal detected in the first anti-duplication control signal detection section 33 or second anti-duplication control signal detection section 34 is not supplied to the duplication control section 37, but a generated control signal for inhibiting duplication may be supplied to the duplication control section 37 as the anti-duplication control signal S25.

On the other hand, the duplication control section 37 which receives supply of the anti-duplication control signal from the output control signal generation section 36 decodes the anti-duplication control signal and judges whether the video signal supplied to the recording device 50 is a video signal of duplication inhibition or duplication permission. Then, the duplication control section 37 generates a write control signal S16 based on the judgement result, and supplies it to the write section 35, hence, the duplication prevention control such as permission or inhibition of writing of the video signal S22 is performed.

If the write control signal S26 is a signal for permitting writing, the write section 35 writes the video signal. S22 in the disk 200, and if the write control signal S26 is a signal for inhibiting writing, the write section 35 does not write the video signal S22.

As described herein above, if both the SS anti-duplication control signal S23 and copy guard signal S24 are not. detected from the digital video signal S21, and if both the SS anti-duplication control signal S23 and copy guard signal S24 are detected, for example, in the case of a generation restriction information for permitting only the first generation duplication of the video signal, the duplication of the video signal is permitted, and the digital video signal S12 supplied to the write section 29 is written in the disk 200.

In other words, if at least any one of the SS anti-duplication control signal 23 and copy guard signal S24 is detected, the recording device 50 performs duplication prevention control based on the detected anti-duplication control signal as shown in FIG. 10.

Further like the recording playback system 40 of the above-mentioned third embodiment, in the case that the copy guard signal is added already on the video signal, alternative method in which the SS anti-duplication control signal is generated based on this copy guard signal, the SS anti-duplication control signal is superimposed on the video signal in addition to the copy guard signal added already, and then the video signal is recorded may be used.

In such case, like the recording playback system of the above-mentioned third embodiment, in the case that the copy guard signal is an information for indicating generation restriction duplication, illegal duplication after legal duplication is also prevented effectively.

By using the output device 10 of the above-mentioned first embodiment or the output device 30 of the second embodiment as a playback system and by using a recording playback device or DVD device having the recording device 50 of the fourth embodiment as a recording system, in the case that the video signal is recorded in the disk 200 using this DVD device, a pair of the copy guard signal and SS anti-duplication control signal generated correlatively is added on the video signal to be recorded in the disk 200 without exception.

When the video signal recorded in the disk 200 is played back using this DVD device, because two types of anti-duplication control signals are detected, the video signal is played back normally.

However, in the case that the video signal recorded in the disk 200 is duplicated illegally by removing the copy guard signal S14 using another recording device, it is possible that the video signal is not played back normally using this DVD device.

In other words, because the copy guard signal which should be added on the video signal is not detected, this DVD device judges the video signal wanted to be played back to be an illegally duplicated video signal, and does not play back the video signal.

This DVD device performs duplication prevention control properly based on the detected anti-duplication control signal, therefore, this DVD device does not duplicate illegally the video signal.

In the above-mentioned first, second, third, and fourth embodiments, the case that the SS anti-duplication control signal that is a spectrally spread anti-duplication control signal and the copy guard signal that is a anti-duplication control signal so-called CGMS are superimposed on the video signal as the anti-duplication control signal is described, however, the present invention is by no means limited to the case.

For example, a method that is a duplication prevention control method utilizing the difference in AGC system or difference in APC characteristics, and a method in which duplication prevention control method so-called macro-vision is used as a pair and these two types of anti-duplication control signals are used, may be used.

In the case of DVD (digital video disk), CD (compact disk), and MD (small-sized magneto-optic disk called as mini-disk), the anti-duplication control signal may be recorded in TOC (Table Of Content) on the innermost or outermost area of a disk or in the track area called as directory, or may be insertion-recorded on the separate recording area on the track where video data and audio data are recorded.

As described herein above, the anti-duplication control signal recorded in TOC or directory may be used in the form of a pair with the SS anti-duplication control signal, so-called CGMS, or so-called macro-vision, or the anti-duplication control signal insertion-recorded on the separate area on the track where video data and audio data are recorded may be used in the form of a pair with the SS anti-duplication control signal. Other various anti-duplication control signals may be used.

The anti-duplication control signal added on the video signal is not limited to two types, but a plurality of types of anti-duplication control signals generated correlatively each other may be added on the video signal.

In the above-mentioned first, second, and third embodiments, the case that the information signal on which the anti-duplication control signal is added or is to be added is the video signal for the purpose of description, however, the present invention is by no means limited to the video signal. For example, audio signals or digital data may be the information signal on which a plurality of anti-duplication control signals generated correlatively is to be added.

In the above-mentioned first, second, and third embodiments, the output devices 10 and 20 and recording device 30 are described to be all DVD devices for the purpose of description, however, such devices are not limited to the DVD device. For example, the present invention can be applied to playback devices and recording devices which use VTR and digital VTR, video disk, video CD, mini-disk called as small-sized magneto-optic disk, and magnetic disk. In other words, the present invention can be applied to both analog apparatus such as analog VTR and also to digital apparatus such as DVD device.

The present invention can be applied to television receivers for receiving various television broadcast such as television broadcast, digital television broadcast, and cable television broadcast, reception devices for receiving various television broadcast and supplying the video signal to monitor receivers, and also to information apparatus such as personal computers for performing so-called personal computer communication.

As described herein above, by applying the present invention to television receivers, reception devices, and information apparatus, wide spread illegal duplication of information signals through broadcasting and communication network is also prevented.

In the above-mentioned first and second embodiments, if at least any one of two types of anti-duplication control signals is not detected, the video signal served as the information signal is not outputted or a notice message is outputted. Further in the third embodiment, if only the specific anti-duplication control signal which is added on the video signal without exception is not detected, the video signal is not outputted. However, the present invention is by no means limited to these cases.

For example, a method, in which if the SS anti-duplication control signal which should be added as the anti-duplication control signal is not detected, output of the playback video signal is inhibited, and if the SS anti-duplication control signal is detected but the copy guard signal is not detected, a notice message is outputted, may be used, and similarly, output control and duplication control may be changed dependently on the detected anti-duplication control signal or the anti-duplication control signal which is not detected.

When a recording medium such as disk on which information signals such as video signals, audio signals, and digital data are recorded is manufactured, a disk in which information signals having a plurality of types of anti-duplication control signals added thereon may be manufactured by adding a plurality of types of anti-duplication control signals generated correlatively each other.

As described hereinbefore, according to the information signal output method, information signal duplication prevention method, information signal duplication prevention device, and information signal recording medium in accordance with the present invention, a plurality of anti-duplication control signals generated correlatively each other is added on the information signal.

Thereby, in the case that the specific anti-duplication control signal out of a plurality of anti-duplication control signals which should be added on the information signal is missed, or in the case that different types of anti-duplication control signals formed originally with correlative generation are added on the information signal and at least any one of them is missed, this information signal is judged to be an illegally duplicated information signal, and output control such as inhibition of the illegally duplicated information signal is performed.

Further, in the case that the information signal is an illegally duplicated information signal, a notice message is outputted, and the message notices a user that the information signal wanted to be outputted is an illegally duplicated information signal.

Thereby, the user can recognize that the information signal is an illegally duplicated information signal if the information signal is in fact an illegally duplicated information signal, and the user can complain against the supplier who supplied the illegally duplicated information signal. Thus, it is easy to expose suppliers who duplicate illegally information signals, and illegal duplication of the information signal is prevented effectively.

What is claimed is:

1. An apparatus for controlling a recording of an information signal on a recording medium comprising:

first detecting means for detecting a first copy control signal related to said information signal;

second detecting means for detecting a second copy control signal related to said information signal; and control means for inhibiting said recording of said information signal on said recording medium when at least one of said first and second copy control signals is detected and when at least one of said detected copy control signals indicates a copy inhibit.

2. The apparatus according to claim 1, wherein when only one of said first and second copy control signals is detected said control means inhibits said recording of said information signal.

3. The apparatus according to claim 1, wherein when neither of said first and second copy control signals is detected said control means permits said recording of said information signal.

4. The apparatus according to claim 1, wherein when both of said first and second copy control signals are detected said control means records the copy control signal having a stricter duplication information, and when only one of said first and second copy control signals is detected said control means records said detected copy control signal.

5. A method for controlling a recording of an information signal on a recording medium comprising the steps of:

detecting a first copy control signal related to said information signal;

detecting a second copy control signal related to said information signal; and inhibiting said recording of said information signal on said recording medium when at least one of said first and second copy control signals is detected and when at least one of said detected copy control signals indicates a copy inhibit.

6. The method according to claim 5, wherein when only one of said first and second copy control signals is detected said recording of said information signal is inhibited.

7. The method according to claim 5, wherein when neither of said first and second copy control signals is detected said recording of said information signal is permitted.

8. The method according to claim 5, wherein when both of said first and second copy control signals are detected the copy control signal having a stricter duplication information is recorded, and when only one of said first and second copy control signals is detected the detected copy control signal is recorded.

* * * * *